US008934429B2

(12) United States Patent  (10) Patent No.: US 8,934,429 B2
Suzuki et al.  (45) Date of Patent: Jan. 13, 2015

(54) WIRELESS COMMUNICATION SYSTEM, BASE STATION APPARATUS, MOBILE STATION APPARATUS, WIRELESS COMMUNICATION METHOD AND INTEGRATED CIRCUIT

(75) Inventors: Shoichi Suzuki, Osaka (JP); Yosuke Akimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/458,831

(22) Filed: Apr. 27, 2012

(65) Prior Publication Data

US 2012/0269144 A1  Oct. 25, 2012

Related U.S. Application Data

(63) Continuation of application No. PCT/JP2010/067540, filed on Oct. 6, 2010.

(30) Foreign Application Priority Data

Oct. 30, 2009 (JP) ................................. 2009-249699

(51) Int. Cl.
*H04W 72/04* (2009.01)
*H04L 5/00* (2006.01)
(Continued)

(52) U.S. Cl.
CPC ............ *H04L 5/0053* (2013.01); *H04L 5/0091* (2013.01); *H04L 5/0023* (2013.01); *H04B 7/0413* (2013.01); *H04B 7/0697* (2013.01); *H04L 5/0048* (2013.01)
USPC ....................................................... 370/329

(58) Field of Classification Search
None
See application file for complete search history.

(56) References Cited

U.S. PATENT DOCUMENTS 8,379,590 B2  2/2013 Hooli et al.
2010/0296465 A1  11/2010 Hooli et al.
(Continued)

FOREIGN PATENT DOCUMENTS

EP  2 056 515 A1  5/2009
JP  2009-171025 A  7/2009

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.211 V8.8.0 (Sep. 2009).
Catt, "UL DMRS design for LTE-A", 3GPP TSG RAN WG1 Meeting #60 R1-100892, Feb. 22-26, 2010.
International Search Report issued in PCT Application No. PCT/JP2010/067540.
(Continued)

*Primary Examiner* — Marcus R Smith
(74) *Attorney, Agent, or Firm* — Birch, Stewart, Kolasch & Birch, LLP

(57) ABSTRACT

In a wireless communication system a base station apparatus and a mobile station apparatus communicate with each other. The base station sets the number of spatial multiplexing sequences (rank) of data being used by the mobile station when transmitting a PUSCH, further sets orthogonal resources used by the mobile station for the same number of reference signals as the set number of spatial multiplexing sequences which are transmitted together with the PUSCH, and transmits downlink control information indicating the number of spatial multiplexing sequences and information indicating the orthogonal resources for the reference signals. The mobile station receives the downlink control information, selects orthogonal resources to respectively apply to the reference signals, applies the selected orthogonal resources to generate the reference signals, and transmits the generated reference signals to the base station apparatus.

9 Claims, 10 Drawing Sheets

(51) Int. Cl.
*H04B 7/04* (2006.01)
*H04B 7/06* (2006.01)

(56) References Cited

U.S. PATENT DOCUMENTS

| | | | |
|---|---|---|---|
| 2011/0142107 A1* | 6/2011 | Pan et al. | 375/219 |
| 2012/0093120 A1* | 4/2012 | Ko et al. | 370/329 |
| 2012/0106473 A1* | 5/2012 | Tiirola et al. | 370/329 |
| 2012/0213195 A1* | 8/2012 | Lunttila et al. | 370/330 |

OTHER PUBLICATIONS

LG Electronics, "Consideration on DM-RS design for UL SU-MIMO in LTE-A" 3GPP TSG RAN WG1 Meeting #59 R1-094785, Nov. 9-13, 2009.

Nokia Siemens Networks, "Reference Signal Sturcture for LTE-Advanced UL SU-MIMO", 3GPP TSG RAN WG1 Meeting #57 R1-091772, May 4-8, 2009.

Nokia Siemens Networks, Nokia, 3GPP TSG RAN WG1 Meeting #58bis R1-093917, Oct. 12-16, 2009.

* cited by examiner

FIG.5A

| | RANK 1 | |
|---|---|---|
| INFORMATION INDICATIVE OF ORTHOGONAL RESOURCES | CYCLIC SHIFT | ORTHOGONAL COVER |
| 000 | 0 | [1,1] |
| 001 | 0 | [1,-1] |
| 010 | $\pi/2$ | [1,1] |
| 011 | $\pi/2$ | [1,-1] |
| 100 | $\pi$ | [1,1] |
| 101 | $\pi$ | [1,-1] |
| 110 | $3\pi/2$ | [1,1] |
| 111 | $3\pi/2$ | [1,-1] |

FIG.5B

| | RANK 2 | | | |
|---|---|---|---|---|
| INFORMATION INDICATIVE OF ORTHOGONAL RESOURCES | PORT 1 | | PORT 2 | |
| | CYCLIC SHIFT | ORTHOGONAL COVER | CYCLIC SHIFT | ORTHOGONAL COVER |
| 000 | 0 | [1,1] | $\pi$ | [1,1] |
| 001 | 0 | [1,-1] | $\pi$ | [1,-1] |
| 010 | 0 | [1,1] | $\pi$ | [1,-1] |
| 011 | 0 | [1,-1] | $\pi$ | [1,1] |
| 100 | $\pi/2$ | [1,1] | $3\pi/2$ | [1,1] |
| 101 | $\pi/2$ | [1,-1] | $3\pi/2$ | [1,-1] |
| 110 | $\pi/2$ | [1,1] | $3\pi/2$ | [1,-1] |
| 111 | $\pi/2$ | [1,-1] | $3\pi/2$ | [1,1] |

FIG.5C

| INFORMATION INDICATIVE OF ORTHOGONAL RESOURCES | RANK 3 ||||||
|---|---|---|---|---|---|---|
| | PORT 1 || PORT 2 || PORT 3 ||
| | CYCLIC SHIFT | ORTHOGONAL COVER | CYCLIC SHIFT | ORTHOGONAL COVER | CYCLIC SHIFT | ORTHOGONAL COVER |
| 000 | 0 | [1,1] | $\pi/2$ | [1,-1] | $\pi$ | [1,1] |
| 001 | 0 | [1,1] | $\pi/2$ | [1,-1] | $3\pi/2$ | [1,-1] |
| 010 | 0 | [1,1] | $\pi$ | [1,1] | $3\pi/2$ | [1,-1] |
| 011 | $\pi/2$ | [1,-1] | $\pi$ | [1,1] | $3\pi/2$ | [1,-1] |
| 100 | 0 | [1,-1] | $\pi/2$ | [1,1] | $\pi$ | [1,-1] |
| 101 | 0 | [1,-1] | $\pi/2$ | [1,1] | $3\pi/2$ | [1,1] |
| 110 | 0 | [1,-1] | $\pi$ | [1,-1] | $3\pi/2$ | [1,1] |
| 111 | $\pi/2$ | [1,1] | $\pi$ | [1,-1] | $3\pi/2$ | [1,1] |

FIG.5D

RANK 4

| INFORMATION INDICATIVE OF ORTHOGONAL RESOURCES | PORT 1 | | PORT 2 | | PORT 3 | | PORT 4 | |
|---|---|---|---|---|---|---|---|---|
| | CYCLIC SHIFT | ORTHOGONAL COVER | CYCLIC SHIFT | ORTHOGONAL COVER | CYCLIC SHIFT | ORTHOGONAL COVER | CYCLIC SHIFT | ORTHOGONAL COVER |
| 000 | 0 | [1,1] | $\pi/2$ | [1,1] | $\pi$ | [1,1] | $3\pi/2$ | [1,1] |
| 001 | 0 | [1,-1] | $\pi/2$ | [1,-1] | $\pi$ | [1,-1] | $3\pi/2$ | [1,-1] |
| 010 | 0 | [1,1] | $\pi/2$ | [1,-1] | $\pi$ | [1,1] | $3\pi/2$ | [1,-1] |
| 011 | 0 | [1,-1] | $\pi/2$ | [1,1] | $\pi$ | [1,-1] | $3\pi/2$ | [1,1] |
| 100 | 0 | [1,1] | $\pi/2$ | [1,1] | $\pi$ | [1,-1] | $3\pi/2$ | [1,-1] |
| 101 | 0 | [1,-1] | $\pi/2$ | [1,-1] | $\pi$ | [1,1] | $3\pi/2$ | [1,1] |
| 110 | 0 | [1,1] | $\pi/2$ | [1,-1] | $\pi$ | [1,-1] | $3\pi/2$ | [1,1] |
| 111 | 0 | [1,-1] | $\pi/2$ | [1,1] | $\pi$ | [1,1] | $3\pi/2$ | [1,-1] |

US 8,934,429 B2

WIRELESS COMMUNICATION SYSTEM, BASE STATION APPARATUS, MOBILE STATION APPARATUS, WIRELESS COMMUNICATION METHOD AND INTEGRATED CIRCUIT

CROSS REFERENCE TO RELATED APPLICATIONS

This application is a Continuation of PCT International Application No. PCT/JP2010/067540 filed on Oct. 6, 2010, which claims the benefit to Patent Application No. 2009-249699 filed in Japan, on Oct. 30, 2009. The entire contents of all of the above applications is hereby incorporated by reference.

TECHNICAL FIELD

The present invention relates to a wireless communication system, base station apparatus, mobile station apparatus, wireless communication method and integrated circuit.

BACKGROUND ART

Conventionally, the 3rd Generation Partnership Project (3GPP) has studied evolution (hereinafter, referred to as "Long Term Evolution (LTE)" or "Evolved Universal Terrestrial Radio Access (EUTRA)") of radio access scheme and radio networks of cellular mobile communication, and radio access scheme and radio networks (hereinafter, referred to as "Long Term Evolution-Advanced (LTE-A)" or "Advanced Evolved Universal Terrestrial Radio Access (A-EUTRA)") for actualizing faster data communications using frequency bands wider than LTE.

In LTE, an Orthogonal Frequency Division Multiplexing (OFDM) scheme that is multicarrier transmission is used as a communication scheme of wireless communication (downlink) from a base station apparatus to a mobile station apparatus. Further, an SC-FDMA (Single-Carrier Frequency Division Multiple Access) scheme that is single-carrier transmission is used as a communication scheme of wireless communication (uplink) from the mobile station apparatus to the base station apparatus. More specifically, a modulated transmission signal is transformed into the signal in the frequency domain by DFT (DiscreteFourierTransform), and the signal is mapped to radio resources (frequency resources) allocated by the base station apparatus, then is transformed into the signal in the time domain by IDFT (Inverse DFT) and is transmitted to the base station apparatus. In LTE-A, SC-FDMA is also referred to as DFT-precoded OFDM.

In LTE, in downlink are assigned the Synchronization Channel (SCH), Physical Broadcast Channel (PBCH), Physical Downlink Control Channel (PDCCH), Physical Downlink Shared Channel (PDSCH), Physical Multicast Channel (PMCH), Physical Control Format Indicator Channel (PCFICH), and Physical Hybrid automatic repeat request Indicator Channel (PHICH). Further, in uplink are assigned the Physical Uplink Shared Channel (PUSCH), Physical Uplink Control Channel (PUCCH), and Physical Random Access Channel (PRACH).

In LTE, a reference signal (Demodulation Reference signal; DMRS) used in demodulation of the PUSCH and PUCCH is time-multiplexed with the PUSCH or PUCCH and transmitted. The DMRS is subjected to code spreading using CAZAC (Constant Amplitude and Zero Auto-Correlation) sequences in radio resources divided with SC-FDMA assumed. The CAZAC sequences are sequences that have constant amplitude in the time domain and the frequency domain and that are excellent in auto-correlation characteristics. The sequences have constant amplitude in the time domain, and are thereby capable of controlling the PAPR (Peak to Average Power Ratio) to within low levels. Further, in the DMRS of LTE, by providing SC-FDMA symbols with the cyclic shift in the time domain, it is possible to perform CDM (Code Division Multiplex) on the DMRS spread using the same CAZAC sequence. However, when the sequence lengths of CAZAC sequences are different from one another, it is not possible to perform CDM. The generation method of DMRS in LTE is described in Non-patent Document 1, section 5.

Non-patent Document 2 proposes further applying orthogonal code (for example, Walsh-Hadamard Code [1,1] and [1,−1]) to DMRSs that are transmitted in different SC-FDMA symbols, in addition to above-mentioned CDM by cyclic shift, in order to enable uplink multi user spatial multiplexing (or also referred to as Uplink Multi User Multiple Input Multiple Output; UL MU-MIMO) between mobile station apparatuses assigned different radio resources in LTE. Hereinafter, the orthogonal code is referred to as orthogonal cover.

PRIOR ART DOCUMENT

Non-Patent Document

Non-patent Document 1: "3GPP TS36.211 v.8.8.0 (2009-09)"

Non-patent Document 2: "Uplink reference signal structure from MU-MIMO viewpoint", 3GPP TSG RAN WG1 Meeting #58bis, R1-093917, Oct. 12-16, 2009.

DISCLOSURE OF INVENTION

Problems to be Solved by the Invention

However, in conventional techniques, the base station apparatus notifies the mobile station apparatus of the length of the cyclic shift on the DMRS in the time domain using the PDCCH, additional control information is required to further notify of the orthogonal cover to apply to the DMRS, and there has been the problem that overhead of the PDCCH increases.

The present invention was made in view of the aforementioned respect, and it is an object of the invention to provide a wireless communication system, base station apparatus, mobile station apparatus, wireless communication method and integrated circuit for enabling the length of the cyclic shift on the DMRS in the time domain and orthogonal cover that the base station apparatus assigns to the mobile station apparatus to be flexibly notified with the same overhead of the PDCCH as conventional overhead kept.

Means for Solving the Problem (1) To attain the aforementioned object, the invention took measures as described below. In other words, a wireless communication system of the invention is a wireless communication system in which a base station apparatus and a mobile station apparatus communicate with each other, and is characterized in that the base station apparatus sets the number of spatial multiplexing sequences (rank) of data, which is the number being used by the mobile station apparatus when the mobile station apparatus transmits a PUSCH, further sets orthogonal resources used by the mobile station apparatus respectively for the same number of reference signals as the set number of spatial multiplexing sequences which are transmitted together with the PUSCH, and transmits downlink control information including information indicative of the set number of spatial multiplexing sequences and information indicative of the set orthogonal resources used for the reference signals, and the mobile station apparatus receives the downlink control information, selects orthogonal resources to respectively apply to the same number of reference signals as the number of spatial multiplexing sequences indicated by the information indicative of the number of spatial multiplexing sequences from the information indicative of the orthogonal resources, and applies the selected orthogonal resources to generate the reference signals, and transmits the generated reference signals to the base station apparatus.

(2) Further, in the wireless communication system of the invention, it is a feature that the orthogonal resources are comprised of a combination of a length of a cyclic shift on the reference signals in the time domain, and an orthogonal code sequence (orthogonal cover) applied to the reference signals that are transmitted twice or more in a plurality of time symbols.

(3) Furthermore, in the wireless communication system of the invention, it is a feature that the number of bits used in the information indicative of the orthogonal resources is a beforehand determined value.

(4) Still furthermore, in the wireless communication system of the invention, it is a feature that orthogonal resources associated with a code point of the information indicative of the orthogonal resources vary with spatial multiplexing sequences of data used by the mobile station apparatus in transmitting the PUSCH.

(5) Moreover, in the wireless communication system of the invention, it is a feature that a first code point of the information indicative of the orthogonal resources indicates that the same orthogonal code sequence (orthogonal cover) is applied to all of the same number of reference signals as the set number of spatial multiplexing sequences, and that a second code point of the information indicative of the orthogonal resources indicates that a plurality of different orthogonal code sequences is applied to the same number of reference signals as the set number of spatial multiplexing sequences.

(6) Further, a base station apparatus of the invention is a base station apparatus that communicates with a mobile station apparatus, and is characterized by setting the number of spatial multiplexing sequences (rank) of data, which is the number being used by the mobile station apparatus when the mobile station apparatus transmits a PUSCH, further setting orthogonal resources used by the mobile station apparatus respectively for the same number of reference signals as the set number of spatial multiplexing sequences which are transmitted together with the PUSCH, and transmitting downlink control information including information indicative of the set number of spatial multiplexing sequences and information indicative of the set orthogonal resources used for the reference signals.

(7) Furthermore, a mobile station apparatus of the invention is a mobile station apparatus that communicates with a base station apparatus, and is characterized by receiving downlink control information, transmitted from the base station apparatus, including information indicative of the number of spatial multiplexing sequences (rank) of data, which is the number being used by the mobile station apparatus when the mobile station apparatus transmits a PUSCH, and information indicative of orthogonal resources respectively used for the same number of reference signals as the number of spatial multiplexing sequences of the PUSCH which are transmitted together with the PUSCH, selecting orthogonal resources to respectively apply to the same number of reference signals as the number of spatial multiplexing sequences indicated by the information indicative of the number of spatial multiplexing sequences from the information indicative of the orthogonal resources, and applying the selected orthogonal resources to generate the reference signals, and transmitting the generated reference signals to the base station apparatus.

(8) Further, a wireless communication method of the invention is a wireless communication method used in abase station apparatus that communicates with a mobile station apparatus, and is characterized by having means for setting the number of spatial multiplexing sequences (rank) of data, which is the number being used by the mobile station apparatus when the mobile station apparatus transmits a PUSCH, means for setting orthogonal resources used by the mobile station apparatus respectively for the same number of reference signals as the set number of spatial multiplexing sequences which are transmitted together with the PUSCH, and means for transmitting downlink control information including information indicative of the set number of spatial multiplexing sequences and information indicative of the set orthogonal resources used for the reference signals.

(9) Furthermore, a wireless communication method of the invention is a wireless communication method used in a mobile station apparatus that communicates with a base station apparatus, and is characterized by having means for receiving downlink control information, transmitted from the base station apparatus, including information indicative of the number of spatial multiplexing sequences (rank) of data, which is the number being used by the mobile station apparatus when the mobile station apparatus transmits a PUSCH, and information indicative of orthogonal resources respectively used for the same number of reference signals as the number of spatial multiplexing sequences of the PUSCH which are transmitted together with the PUSCH, means for selecting orthogonal resources to respectively apply to the same number of reference signals as the number of spatial multiplexing sequences indicated by the information indicative of the number of spatial multiplexing sequences from the information indicative of the orthogonal resources, and means for applying the selected orthogonal resources to generate the reference signals, and transmitting the generated reference signals to the base station apparatus.

(10) Further, an integrated circuit of the invention is an integrated circuit used in in a base station apparatus that communicates with a mobile station apparatus, and is characterized by making a series of means chip form to be executable where the series of means includes means for setting the number of spatial multiplexing sequences (rank) of data, the number being used by the mobile station apparatus when the mobile station apparatus transmits a PUSCH, means for setting orthogonal resources used by the mobile station apparatus respectively for the same number of reference signals as the set number of spatial multiplexing sequences which are transmitted together with the PUSCH, and means for transmitting downlink control information including information indicative of the set number of spatial multiplexing sequences and information indicative of the set orthogonal resources used for the reference signals.

(11) Furthermore, an integrated circuit of the invention is an integrated circuit used in a mobile station apparatus that communicates with a base station apparatus, and is characterized by making a series of means chip form to be executable where the series of means includes means for receiving downlink control information, transmitted from the base station apparatus, including information indicative of the number of spatial multiplexing sequences (rank) of data, which is the number being used by the mobile station apparatus when the mobile station apparatus transmits a PUSCH, and information indicative of orthogonal resources respectively used for the same number of reference signals as the number of spatial multiplexing sequences of the PUSCH which are transmitted together with the PUSCH, means for selecting orthogonal resources to respectively apply to the same number of reference signals as the number of spatial multiplexing sequences indicated by the information indicative of the number of spatial multiplexing sequences from the information indicative of the orthogonal resources, and means for applying the selected orthogonal resources to generate the reference signals, and transmitting the generated reference signals to the base station apparatus.

Advantageous Effect of the Invention

According to the invention, it is possible to notify of the length of the cyclic shift on the DMRS in the time domain and orthogonal cover that the base station apparatus assigns to the mobile station apparatus to be flexibly notified with the same overhead of the PDCCH as conventional overhead kept.

BRIEF DESCRIPTION OF DRAWINGS

FIG. 5A is a diagram showing an example of a correspondence table of the number of spatial multiplexing sequences, orthogonal resources and code point according to this Embodiment;

FIG. 5B is another diagram showing an example of the correspondence table of the number of spatial multiplexing sequences, orthogonal resources and code point according to this Embodiment;

FIG. 5C is still another diagram showing an example of the correspondence table of the number of spatial multiplexing sequences, orthogonal resources and code point according to this Embodiment;

FIG. 5D is further another diagram showing an example of the correspondence table of the number of spatial multiplexing sequences, orthogonal resources and code point according to this Embodiment;

BEST MODE FOR CARRYING OUT THE INVENTION

Figure 1:
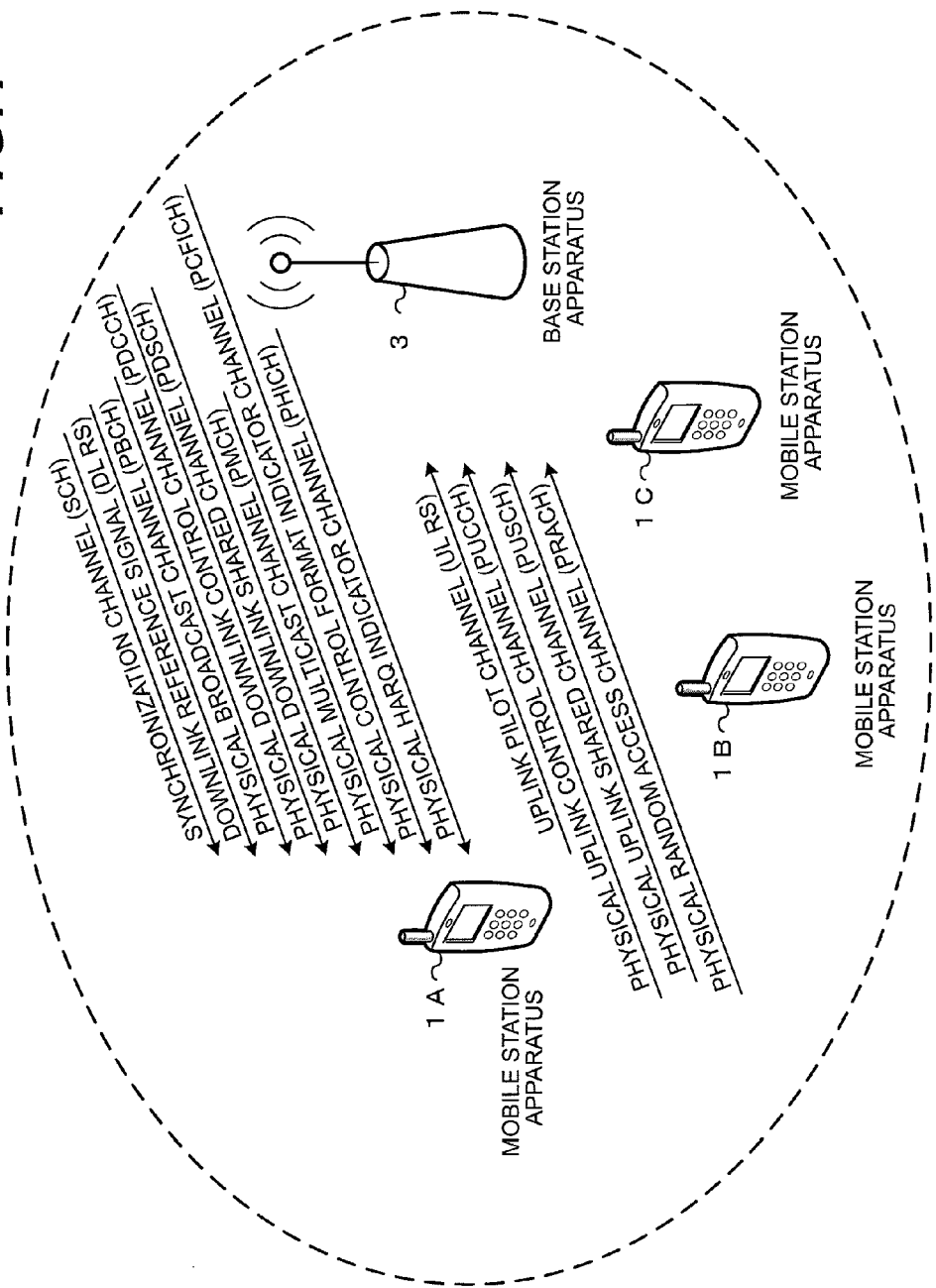
FIG. 1 is a conceptual diagram of a wireless communication system according to this Embodiment.

An Embodiment of the invention will be described below with reference to drawings. FIG. 1 is a conceptual diagram of a wireless communication system according to this Embodiment. In FIG. 1, the wireless communication system is provided with mobile station apparatuses 1A to 1C and a base station apparatus 3. The mobile station apparatuses 1A to 1C and base station apparatus 3 perform communications using frequency band aggregation, described later.

FIG. 1 shows that the Synchronization Channel (SCH), Downlink Reference Signal (DL RS), Physical Broadcast Channel (PBCH), Physical Downlink Control Channel (PDCCH), Physical Downlink Shared Channel (PDSCH), Physical Multicast Channel (PMCH), Physical Control Format Indicator Channel (PCFICH), and Physical Hybrid ARQ Indicator Channel (PHICH) are assigned in wireless communication (downlink) from the base station apparatus 3 to the mobile station apparatuses 1A to 1C.

Further, FIG. 1 shows that the Uplink Reference Signal (UL RS), Physical Uplink Control Channel (PUCCH), Physical Uplink Shared Channel (PUSCH), and Physical Random Access Channel (PRACH) are assigned in wireless communication (uplink) from the mobile station apparatuses 1A to 1C to the base station apparatus 3. The Uplink Reference Signal includes a DMRS (Demodulation Reference Signal) which is time-multiplexed with the PUSCH or PUCCH to be transmitted and is used for channel compensation of the PUSCH and PUCCH, and an SRS (Sounding Reference Signal) used for the base station apparatus 3 to estimate an uplink channel state. Hereinafter, the mobile station apparatuses 1A to 1C are referred to as a mobile station apparatus 1.

<In Regard to an Uplink Radio Frame>

Figure 2:
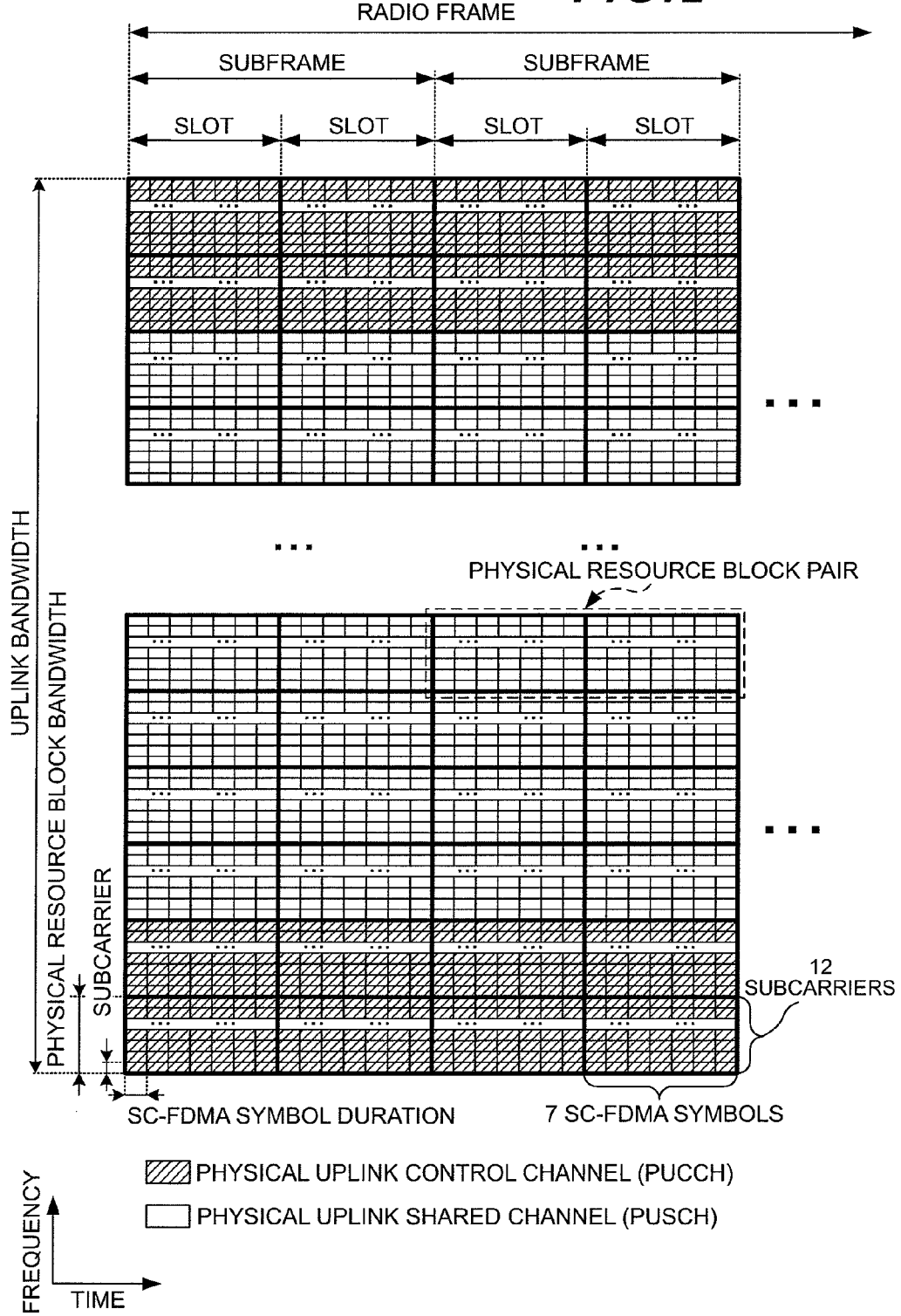
FIG. 2 is a schematic diagram showing an example of a configuration of an uplink radio frame according to this Embodiment.

FIG. 2 is a schematic diagram showing an example of a configuration of an uplink radio frame according to this Embodiment. In FIG. 2, the horizontal axis represents the time domain, and the vertical axis represents the frequency domain. As shown in FIG. 2, an uplink radio frame is comprised of a plurality of uplink Physical Resource Block (PRB) pairs (for example, region enclosed by dashed lines in FIG. 2). This uplink Physical Resource Block pair is a unit for radio resource allocation and the like, and is comprised of a frequency band (PRB bandwidth; 180 kHz) and time band (two slots=one subframe; 1 ms) with beforehand determined widths. A single uplink Physical Resource Block pair is comprised of two uplink Physical Resource Blocks (PRB bandwidth×slots) consecutive in the time domain. A single uplink Physical Resource Block (unit enclosed by bold line in FIG. 2) is comprised of 12 subcarriers (15 kHz) in the frequency domain and 7 SC-FDMA symbols (71 µs) in the time domain.

In the time domain, there are a slot (0.5 ms) comprised of 7 SC-FDMA (Single-Carrier Frequency Division Multiple Access) symbols, sub-frame (1 ms) comprised of two slots, and radio frame (10 ms) comprised of 10 subframes. In the frequency domain, a plurality of uplink Physical Resource Blocks is arranged corresponding to the bandwidth of an uplink component carrier. In addition, a unit comprised of a single subcarrier and a single SC-FDMA symbol is referred to as an uplink resource element.

Channels assigned into the uplink radio frame will be described below. In each subframe in uplink, for example, the PUCCH, PUSCH and DMRS are assigned.

The PUCCH will be described first. The PUCCH is assigned to uplink Physical Resource Block pairs (regions hatched by left diagonal lines) at both ends of the bandwidth of the uplink component carrier. On the PUCCH are arranged signals of Channel Quality Information indicative of downlink channel quality, Scheduling Request (SR) indicative of a request for allocation of uplink radio resources, ACK/NACK for the PDSCH, and the like such as Uplink Control Information (UCI) that is information used in control of communications.

The PUSCH will be described next. The PUSCH is assigned to uplink Physical Resource Block pairs (regions that are not hatched) except the uplink Physical Resource Blocks in which the PUCCH is arranged. On the PUSCH are arranged signals of Uplink Control Information, and data information (Transport Block) that is information except the Uplink Control Information. The radio resources of the PUSCH are allocated using Downlink Control Information (DCI) transmitted on the PDCCH, and the PUSCH is arranged in an uplink subframe a predetermined time after the subframe in which the PDCCH including the Downlink Control Information is received.

The Downlink Control Information indicative of allocation of radio resources of the PUSCH is also referred to as an Uplink grant. Further, the Uplink grant includes information (second control information) indicative of the number of spatial multiplexing sequences (rank, or also referred to as the number of layers) in applying, to the PUSCH, uplink multi user spatial multiplexing (or also referred to as Uplink Multi User Multiple Input Multiple Output; UL MU-MIMO) and/or uplink single user spatial multiplexing (or also referred to as Uplink Single User Multiple Input Multiple Output; UL SU-MIMO), information (first control information) indicative of orthogonal resources used in the DMRS time-multiplexed with the PUSCH, etc. In addition, the orthogonal resources represent a combination of the cyclic shift and orthogonal cover to apply to the DMRS.

UL SU-MIMO is of techniques in which a single mobile station apparatus 1 transmits data of different sequences (hereinafter, which are referred to as layers) in the same time with the same frequency from a plurality of transmission antennas, the base station apparatus 3 demodulates and divides respective sequences of data using the difference between transmission/reception channels in reception, and faster communications are thereby actualized. Meanwhile, UL MU-MIMO is of techniques in which a plurality of mobile station apparatuses 1 transmits the data in the same time with the same frequency, the base station apparatus 3 divides one or more sequences of data transmitted from each mobile station apparatus 1 in reception, and spectrum efficiency is thereby improved. In SU-MIMO and MU-MIMO, it is necessary that the receiver knows channel information associated with each of the transmission antennas and the reception antennas. Therefore, in SU-MIMO and MU-MIMO, transmitted are orthogonal DMRSs of at least the same number of sequences as the number (hereinafter, which is referred to as a "rank") of sequences to spatially multiplex. Hereinafter, the sequence of the reference signal is referred to as a port.

Figure 3:
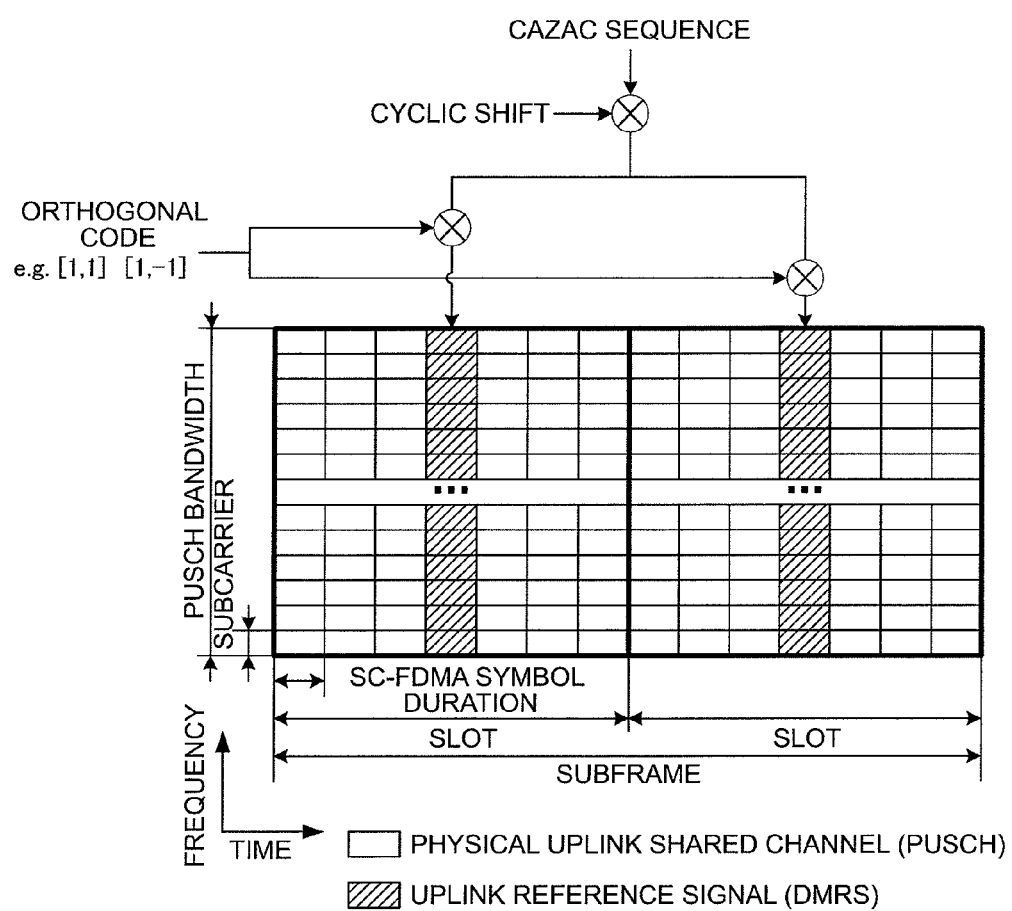
FIG. 3 is a schematic diagram showing an example of a configuration of DMRS according to this Embodiment.

The uplink reference signal is time-multiplexed with the PUCCH and PUSCH. FIG. 3 is a schematic diagram showing an example of a configuration of the DMRS according to this Embodiment. In FIG. 3, the horizontal axis represents the time domain, and the vertical axis represents the frequency domain. FIG. 3 shows generation of the DMRS and mapping in the frequency domain and the time domain with attention directed toward one port. As shown in FIG. 3, the DMRS is arranged in the 4th and 11th SC-FDMA symbols in the time domain, while being arranged in the same frequency as the PUSCH in the frequency domain.

Further, the DMRS is assigned orthogonal resources for each port transmitted from the same mobile station apparatus 1 and/or for each port transmitted from different mobile station apparatuses 1. As shown in FIG. 3, the DMRSs are orthogonalized by rotating the phase for each subcarrier with respect to the CAZAC sequence of the DMRS, thereby providing the DFT-processed SC-FDMA symbol with the cyclic shift in the time domain, and multiplying the CAZAC sequence to arrange the 4th DMRS and 11th DMRS by the orthogonal cover. In addition, since the cyclic shift in the time domain provides complete orthogonalization only in the case of the same CAZAC sequence, when DMRSs generated using different CAZAC sequences are multiplexed, complete orthogonal characteristics are ensured only by the orthogonal cover.

<In Regard to a Configuration of the Base Station Apparatus 3>

Figure 4:
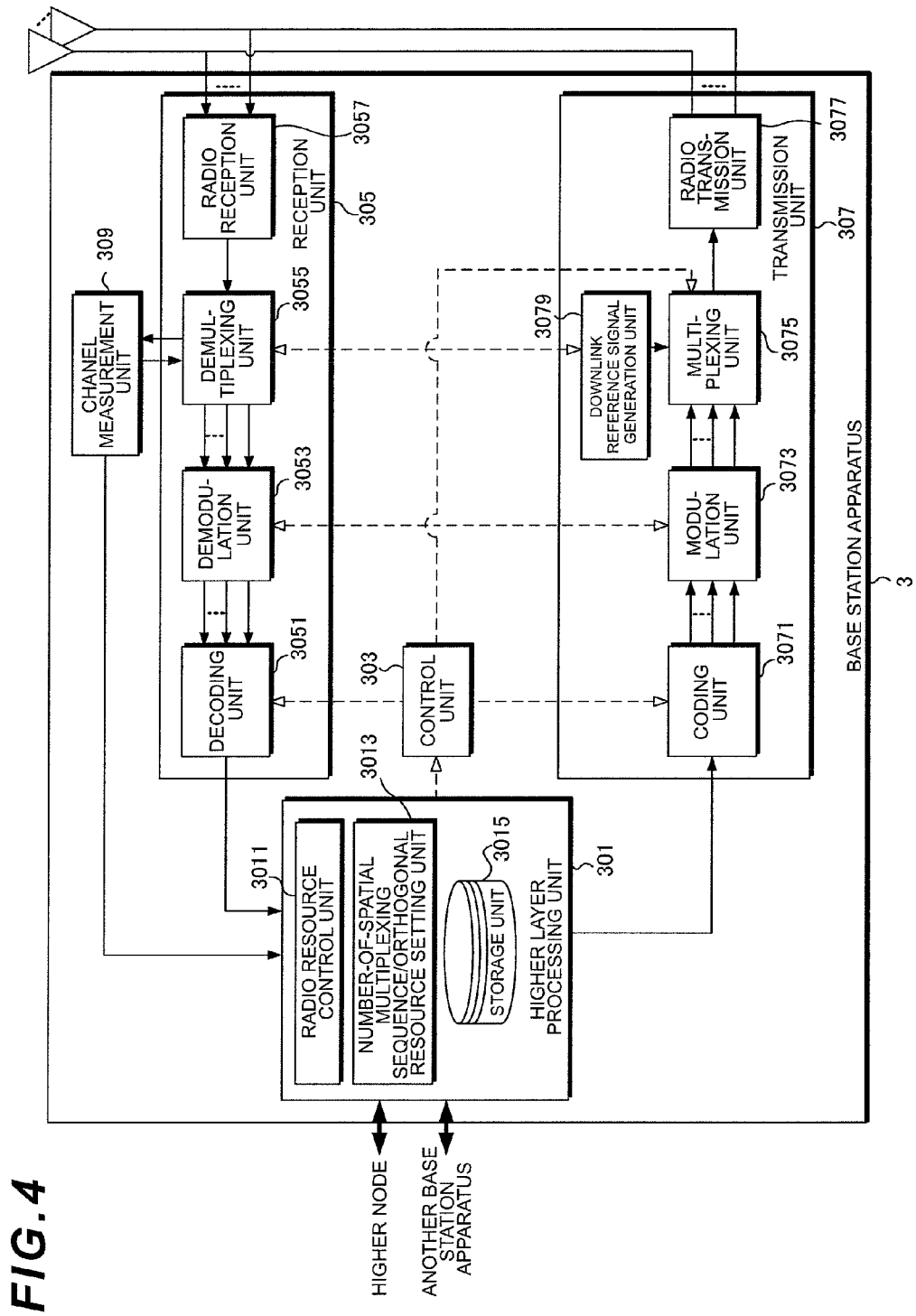
FIG. 4 is a schematic block diagram illustrating a configuration of a base station apparatus 3 according to this Embodiment.

FIG. 4 is a schematic block diagram illustrating a configuration of the base station apparatus 3 according to this Embodiment. As shown in the figure, the base station apparatus 3 includes higher layer processing parts 301, control parts 303, reception parts 305, transmission parts 307, channel measurement parts 309 and transmission/reception antennas and is comprised thereof. Further, the higher layer processing part 301 includes a radio resource control part 3011, number-of-spatial multiplexing sequence/orthogonal resource setting part 3013 and storage part 3015 and is comprised thereof. Meanwhile, the reception part 305 includes a decoding part 3051, demodulation part 3053, demultiplexing part 3055 and radio reception part 3057 and is comprised thereof. Further, the transmission part 307 includes a coding part 3071, modulation part 3073, multiplexing part 3075, radio transmission part 3077, and downlink reference signal generation part 3079 and is comprised thereof.

The higher layer processing part 301 outputs data information for each downlink component carrier to the transmission part 307. Further, the higher layer processing part 301 performs processing of the Packet Data Convergence Protocol (PDCP) layer, Radio Link Control (RLC) layer and Radio Resource Control (RRC) layer.

The radio resource control part 3011 provided in the higher layer processing part 301 generates information to arrange in each channel of each downlink component carrier or acquires such information from a higher node to output to the transmission part 307. Further, the radio resource control part 3011 allocates radio resources for the mobile station apparatus 1 to arrange the PUSCH (data information) from among uplink radio resources. Furthermore, the radio resource control part 3011 allocates radio resources to arrange the PDSCH (data information) for the mobile station apparatus 1 from among downlink radio resources. Still furthermore, the radio resource control part 3011 generates the Downlink Control Information (for example, Uplink grant, etc.) indicative of allocation of the radio resources, and transmits the information to the mobile station apparatus 1 via the transmission part 307. Moreover, in generating the Uplink grant, the radio resource control part 3011 includes, in the Uplink grant, the information (second control information) indicative of the number of spatial multiplexing sequences and the information (first control information) indicative of orthogonal resources used in the DMRS time-multiplexed with the PUSCH input from the number-of-spatial multiplexing sequence/orthogonal resource setting part 3013.

Meanwhile, the radio resource control part 3011 generates the control information to perform control of the reception part 305 and the transmission part 307 to output to the control part 303, based on the Uplink Control Information (ACK/NACK, Channel Quality Information, and Scheduling Request) notified on the PUCCH from the mobile station apparatus 1, status of buffer notified from the mobile station apparatus 1, and various kinds of setting information of each mobile station apparatus 1 set by the radio resource control part 3011.

The number-of-spatial multiplexing sequence/orthogonal resource setting part 3013 sets the number of spatial multiplexing sequences of data used by the mobile station apparatus 1 in transmitting the PUSCH from estimation values of channels input from the channel estimation part 309, and further sets, for each port, orthogonal resources used by the mobile station apparatus 1 for the DMRS to transmit together with the PUSCH. In addition, the number-of-spatial multiplexing sequence/orthogonal resource setting part 3013 selects a combination of the cyclic shift and orthogonal cover of orthogonal resources used in the DMRS from combinations of a table stored in the storage part 3015. Further, the number-of-spatial multiplexing sequence/orthogonal resource setting part 3013 generates the information (second control information) indicative of the number of spatial multiplexing sequences set on the mobile station apparatus 1 and the information (first control information) indicative of orthogonal resources used in the DMRS time-multiplexed with the PUSCH to output to the radio resource control part 3011.

The storage part 3015 stores, in table form, correspondence between the number (rank) of spatial multiplexing sequences and a code point (or, referred to as a code word or bit sequence) of information indicative of orthogonal resources associated with orthogonal resources used in the DMRS assigned for each port. FIG. 5 contains diagrams showing an example of the correspondence table of the number of spatial multiplexing sequences, orthogonal resources and code point according to this Embodiment. In addition, the length of the cyclic shift in the time domain is described as a phase rotation amount for each subcarrier to multiply in the frequency domain.

FIG. 5A is a table showing combinations of orthogonal resources used in the DMRS that can be set by the number-of-spatial multiplexing sequence/orthogonal resource setting part 3013 in the case where the number of spatial multiplexing sequences is "1", and code points associated with the combinations. For example, when the number-of-spatial multiplexing sequence/orthogonal resource setting part 3013 sets the number of spatial multiplexing sequences at "1", the cyclic shift at "0", and the orthogonal cover at [1,1] for the mobile station apparatus 1, the number-of-spatial multiplexing sequence/orthogonal resource setting part 3013 generates "000" as a code word to arrange in the information indicative of orthogonal resources.

FIG. 5B is a table showing combinations of orthogonal resources used in the DMRS that can be set by the number-of-spatial multiplexing sequence/orthogonal resource setting part 3013 in the case where the number of spatial multiplexing sequences is "2", and code points associated with the combinations. For example, when the number-of-spatial multiplexing sequence/orthogonal resource setting part 3013 sets the number of spatial multiplexing sequences at "2", the cyclic shift of port 1 at "0", the orthogonal cover of port 1 at [1,1], the cyclic shift of port 2 at "π", and the orthogonal cover of port 2 at [1, 1] for the mobile station apparatus 1, the number-of-spatial multiplexing sequence/orthogonal resource setting part 3013 generates "000" as a code word to arrange in the information indicative of orthogonal resources.

FIG. 5C is a table showing combinations of orthogonal resources used in the DMRS that can be set by the number-of-spatial multiplexing sequence/orthogonal resource setting part 3013 in the case where the number of spatial multiplexing sequences is "3", and code points associated with the combinations. For example, when the number-of-spatial multiplexing sequence/orthogonal resource setting part 3013 sets the number of spatial multiplexing sequences at "3", the cyclic shift of port 1 at "0", the orthogonal cover of port 1 at [1,1] the cyclic shift of port 2 at "π/2", the orthogonal cover of port 2 at [1, −1], the cyclic shift of port 3 at "π", and the orthogonal cover of port 3 at [1, 1] for the mobile station apparatus 1, the number-of-spatial multiplexing sequence/orthogonal resource setting part 3013 generates "000" as a code word to arrange in the information indicative of orthogonal resources.

FIG. 5D is a table showing combinations of orthogonal resources used in the DMRS that can be set by the number-of-spatial multiplexing sequence/orthogonal resource setting part 3013 in the case where the number of spatial multiplexing sequences is "4", and code points associated with the combinations. For example, when the number-of-spatial multiplexing sequence/orthogonal resource setting part 3013 sets the number of spatial multiplexing sequences at "4", the cyclic shift of port 1 at "0", the orthogonal cover of port 1 at [1,1] the cyclic shift of port 2 at "π/2", the orthogonal cover of port 2 at [1, 1], the cyclic shift of port 3 at "π", the orthogonal cover of port 3 at [1, 1], the cyclic shift of port 4 at "3π/2", and the orthogonal cover of port 4 at [1, 1] for the mobile station apparatus 1, the number-of-spatial multiplexing sequence/orthogonal resource setting part 3013 generates "000" as a code word to arrange in the information indicative of orthogonal resources.

In other words, the number-of-spatial multiplexing sequence/orthogonal resource setting part 3013 selects a code point to arrange in the information indicative of orthogonal resources from combinations of the rank and orthogonal resources set on the mobile station apparatus 1. In addition, as described in FIG. 5, even when the information indicative of the orthogonal resources is the same code point, interpretation of the code point is different corresponding to the number of spatial multiplexing sequences.

The control part 303 generates a control signal to control the reception part 305 and the transmission part 307, based on the control information from the higher layer processing part 301. The control part 303 outputs the generated control signal to the reception part 305 and the transmission part 307 to control the reception part 305 and the transmission part 307.

According to the control signal input from the control part 303, the reception part 305 demultiplexes, demodulates and decodes the reception signal received from the mobile station apparatus 1 via the transmission/reception antenna, and outputs the decoded information to the higher layer processing part 301. The radio reception part 3057 converts (down-converts) each uplink signal received via the transmission/reception antenna into a signal of an intermediate frequency, removes unnecessary frequency components, controls the amplification level so that the signal level is properly maintained, performs quadrature demodulation based on the in-phase component and quadrature component of the received signal, and converts the quadrature-demodulated analog signal into a digital signal. The radio reception part 3057 removes a portion corresponding to a guard interval (GI) from the converted digital signal. The radio reception part 3057 performs Fast Fourier Transform (FFT) on the signal from which the guard interval is removed, and extracts the signal in the frequency domain to output to the demultiplexing part 3055.

The demultiplexing part 3055 demultiplexes the signal input from the radio reception part 3057 into signals of the PUCCH, PUSCH, Uplink Reference Signals (DMRS, SRS) and the like. In addition, this demultiplexing is performed based on the allocation information of radio resources included in the Uplink grant which is beforehand determined by the base station apparatus 3 and notified to each mobile station apparatus 1. Further, the demultiplexing part 3055 outputs the demultiplexed PUSCH and Uplink Reference Signals (DMRS, SRS) to the channel measurement part 309. Furthermore, the demultiplexing part 3055 performs channel compensation of the PUCCH and/or PUSCH from the estimation value of the uplink channel input from the channel measurement part 309.

Moreover, when UL SU-MIMO and/or UL MU-MIMO is applied to the PUSCH and the data is spatially multiplexed by two ports or more in the same time with the same frequency, the demultiplexing part 3055 divides the time and frequency positions to which data of respective ports is spatially multiplexed, and further, divides the data of respective ports.

The demodulation part 3053 performs Inverse Discrete Fourier Transform (IDFT) on the PUSCH, acquires modulation symbols, and with respect to the modulation symbols of the PUCCH and PUSCH, demodulates the reception signal using a modulation scheme of Binary Phase Shift Keying (BPSK), Quadrature Phase Shift Keying (QPSK), 16 Quadrature Amplitude Modulation (16QAM), 64 Quadrature Amplitude Modulation (64QAM) or the like which is beforehand determined or the base station apparatus 3 beforehand notifies each mobile station apparatus 1 in the Uplink grant.

The decoding part 3051 decodes coded bits of the demodulated PUCCH and PUSCH with a coding rate which is beforehand determined or the base station apparatus 3 beforehand notifies the mobile station apparatus 1 in the Uplink grant of a be forehand determined coding scheme, and outputs the decoded data information and Uplink Control Information to the higher layer processing part 301.

The channel measurement part 309 estimates the state of the channel from the PUSCH and Uplink Reference Signals (DMRS, SRS) input from the demultiplexing part 3055, and outputs the estimated channel estimation value to the demultiplexing part 3055 and higher layer processing part 301.

The transmission part 307 generates a Downlink Reference Signal according to the control signal input from the control part 303, encodes and modulates the data information and Downlink Control Information input from the higher layer processing part 301, and multiplexes the PDCCH, PDSCH and Downlink Reference signal to transmit to the mobile station apparatus 1 via the transmission/reception antenna.

The coding part 3071 performs coding such as turbo coding, convolutional coding, block coding and the like on the Downlink Control Information and data information of each downlink component carrier input from the higher layer processing part 301. The modulation part 3073 modulates coded bits input from the coding part 3071 with the modulation scheme of QPSK, 16QAM, 64QAM or the like. The downlink reference signal generation part 3079 generates, as a Downlink Reference Signal, a sequence that the mobile station apparatus 1 knows and that is obtained by a rule beforehand determined based on a cell identifier (Cell ID) to identify the base station apparatus 3 or the like. The multiplexing part 3075 multiplexes each modulated channel and the generated Downlink Reference Signal.

The radio transmission part 3077 performs Inverse Fast Fourier Transform (IFFT) on the multiplexed modulation symbol, performs modulation of the OFDM scheme, adds a guard interval to the OFDM-modulated OFDM symbol, generates a baseband digital signal, converts the baseband digital signal into an analog signal, generates an in-phase component and quadrature component of the intermediate frequency from the analog signal, removes excessive frequency components with respect to the intermediate frequency band, converts (up-converts) the signal of the intermediate frequency into a signal of a high frequency, removes excessive frequency components, amplifies power, and outputs the signal to the transmission/reception antenna to transmit.

<In Regard to a Configuration of the Mobile Station Apparatus 1>

Figure 6:
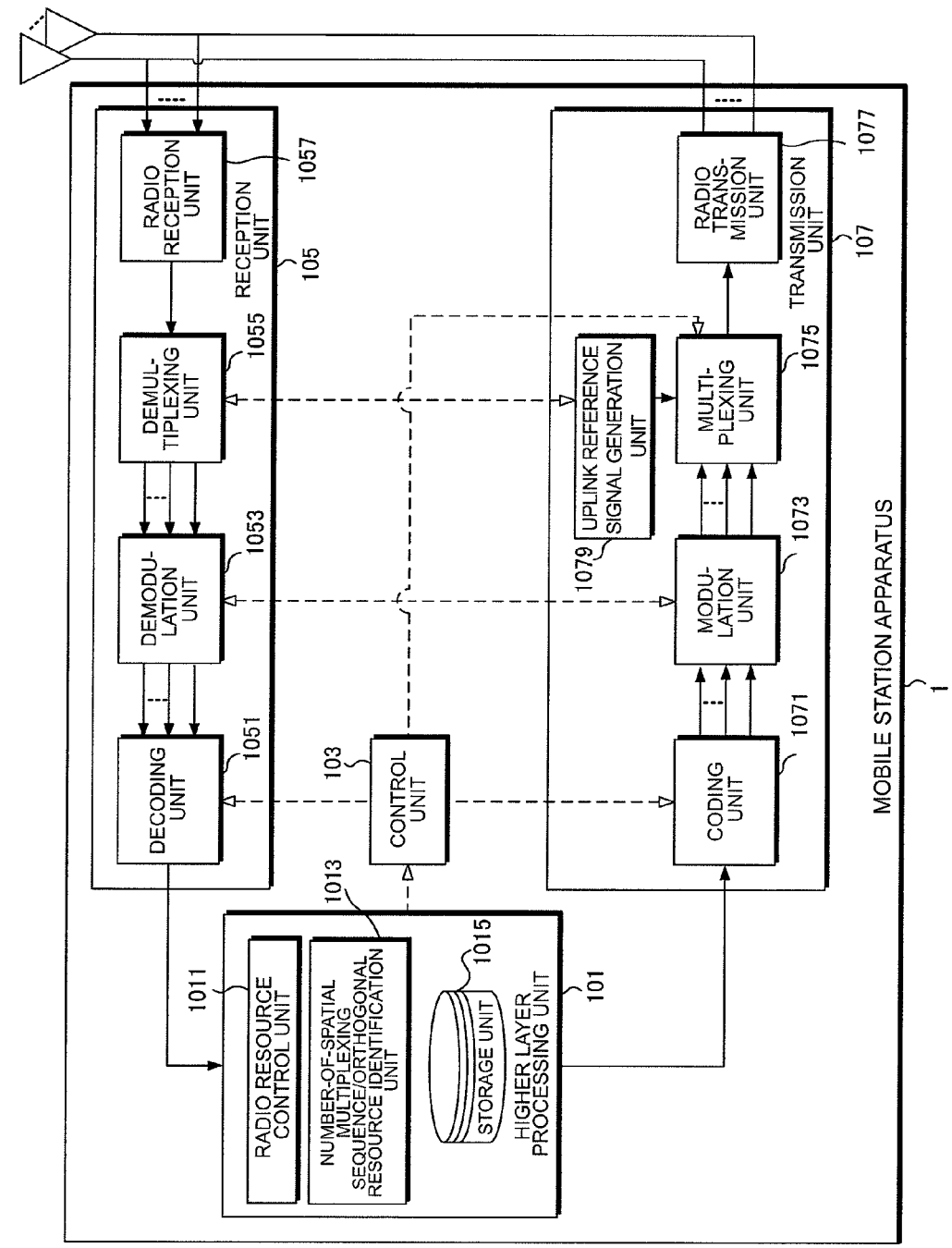
FIG. 6 is a schematic block diagram illustrating a configuration of a mobile station apparatus 1 according to this Embodiment.

FIG. 6 is a schematic block diagram illustrating a configuration of the mobile station apparatus 1 according to this Embodiment. As shown in the figure, the mobile station apparatus 1 includes higher layer processing parts 101, control parts 103, reception parts 105, transmission parts 107, and transmission/reception antennas and is comprised thereof. Further, the higher layer processing part 101 includes a radio resource control part 1011, number-of-spatial multiplexing sequence/orthogonal resource identification part 1013 and storage part 1015 and is comprised thereof. Meanwhile, the reception part 105 includes a decoding part 1051, demodulation part 1053, demultiplexing part 1055 and radio reception part 1057 and is comprised thereof. Further, the transmission part 107 includes a coding part 1071, modulation part 1073, multiplexing part 1075, radio transmission part 1077, and uplink reference signal generation part 1079 and is comprised thereof.

The higher layer processing part 101 outputs uplink data information generated by user operation or the like to the transmission part 107. Further, the higher layer processing part 101 performs processing of the Packet Data Convergence Protocol layer, Radio Link Control layer and Radio Resource Control layer.

The radio resource control part 1011 provided in the higher layer processing part 101 manages various kinds of setting information of the apparatus 1. Further, the radio resource control part 1011 generates information to arrange in each channel in uplink to output to the transmission part 107. The radio resource control part 1011 generates control information to control the reception part 105 and the transmission part 107 to output to the control part 103, based on the Downlink Control Information (for example, Uplink grant, etc.) notified on the PDCCH from the base station apparatus 3, and various kinds of setting information of the apparatus 1 managed in the radio resource control part 1011.

The number-of-spatial multiplexing sequence/orthogonal resource identification part provided in the higher layer processing part 101 identifies the number of spatial multiplexing sequences from the information indicative of the number of spatial multiplexing sequences included in the Uplink grant. Further, the number-of-spatial multiplexing sequence/orthogonal resource identification part 1013 refers to the storage part 1015, and identifies orthogonal resources used in the DMRS, based on the information indicative of the number of spatial multiplexing sequences and information indicative of the orthogonal resources used in the DMRS included in the Uplink grant. Furthermore, the number-of-spatial multiplexing sequence/orthogonal resource identification part 1013 generates control information to control the transmission part 107 so as to transmit the PUSCH as the identified number of spatial multiplexing sequences, and arrange the DMRS to be time-multiplexed with the PUSCH in the identified orthogonal resources, and outputs the control information to the control part 103.

The storage part 1015 provided in the higher layer processing part 101 stores the same correspondence table as the correspondence table of the number of spatial multiplexing sequences, orthogonal resources and the code point stored in the storage part 3015 of the base station apparatus 3. For example, when the information indicative of the number of spatial multiplexing sequences indicates "1", and the code word of the information indicative of orthogonal resources used in the DMRS is "000", from the correspondence table in FIG. 5A, it is possible to identify that the cyclic shift of orthogonal resources used in the DMRS is "0", and that the orthogonal cover is [1,1].

Further, when the information indicative of the number of spatial multiplexing sequences indicates "2", and the code word of the information indicative of orthogonal resources used in the DMRS is "000", from the correspondence table in FIG. 5B, it is possible to identify that the cyclic shift of orthogonal resources used in the DMRS of port 1 is "0", the orthogonal cover is [1,1], the cyclic shift of orthogonal resources used in the DMRS of port 2 is "$\pi$", and that the orthogonal cover is [1,1].

Furthermore, when the information indicative of the number of spatial multiplexing sequences indicates "3", and the code word of the information indicative of orthogonal resources used in the DMRS is "000", from the correspondence table in FIG. 5C, it is possible to identify that the cyclic shift of orthogonal resources used in the DMRS of port 1 is "0", the orthogonal cover is [1,1], the cyclic shift of orthogonal resources used in the DMRS of port 2 is "$\pi/2$", the orthogonal cover is [1,–1] the cyclic shift of orthogonal resources used in the DMRS of port 3 is "$\pi$", and that the orthogonal cover is [1,1].

Still furthermore, when the information indicative of the number of spatial multiplexing sequences indicates "4, and the code word of the information indicative of orthogonal resources used in the DMRS is "000", from the correspondence table in FIG. 5D, it is possible to identify that the cyclic shift of orthogonal resources used in the DMRS of port 1 is "0", the orthogonal cover is [1,1], the cyclic shift of orthogonal resources used in the DMRS of port 2 is "$\pi/2$", the orthogonal cover is [1,–1] the cyclic shift of orthogonal resources used in the DMRS of port 3 is "$\pi$", the orthogonal cover is [1,1], the cyclic shift of orthogonal resources used in the DMRS of port 4 is "$3\pi/2$", and that the orthogonal cover is [1,1].

The control part 103 generates a control signal to control the reception part 105 and the transmission part 107, based on the control information from the higher layer processing part 101. The control part 103 outputs the generated control signal to the reception part 105 and the transmission part 107 to control the reception part 105 and the transmission part 107.

According to the control signal input from the control part 103, the reception part 105 demultiplexes, demodulates and decodes the reception signal received from the base station apparatus 3 via the transmission/reception antenna, and outputs the decoded information to the higher layer processing part 101.

The radio reception part 1057 converts (down-converts) a signal of each uplink component carrier received via each transmission/reception antenna into a signal of an intermediate frequency, removes unnecessary frequency components, controls the amplification level so that the signal level is properly maintained, performs quadrature demodulation based on the in-phase component and quadrature component of the received signal, and converts the quadrature-demodulated analog signal into a digital signal. The radio reception part 1057 removes a portion corresponding to a guard interval from the converted digital signal, performs Fast Fourier Transform on the signal from which the guard interval is removed, and extracts the signal in the frequency domain.

The demultiplexing part 1055 demultiplexes the extracted signal into the PUCCH, PUSCH, and Downlink Reference Signal. In addition, this demultiplexing is performed based on the allocation information of radio resources notified by the Downlink Control Information, etc. Further, the demultiplexing part 1055 obtains an estimation value of the channel from the demultiplexed Downlink Reference Signal and performs channel compensation of the PDCCH and PDSCH.

The demodulation part 1053 demodulates the PDCCH with the QPSK modulation scheme to output to the decoding part 1051. The decoding part 1051 attempts to decode the PDCCH, and when the part succeeds in decoding, outputs the decoded Downlink Control Information to the higher layer processing part 101. The demodulation part 1053 demodulates the PDSCH with the modulation scheme of QPSK, 16QAM, 64QAM or the like notified by the Downlink Control Information to output to the decoding part 1051. The decoding part 1051 performs decoding associated with the coding rate notified by the Downlink Control Information, and outputs the decoded data information to the higher layer processing part 101.

The transmission part 107 generates an Uplink Reference Signal according to the control signal input from the control part 103, encodes and modulates the data information input from the higher layer processing part 101, and multiplexes the PUCCH, PUSCH and generated Uplink Reference Signal to transmit to the base station apparatus 3 via the transmission/reception antenna.

The coding part 1071 performs coding such as turbo coding, convolutional coding, block coding and the like on the Uplink Control Information and data information input from the higher layer processing part 101. The modulation part 1073 modulates coded bits input from the coding part 1071 with the modulation scheme of BPSK, QPSK, 16QAM, 64QAM or the like. Further, the modulation part 1073 rearranges modulation symbols for ports corresponding to the number of spatial multiplexing sequences, and preforms precoding on the signal for spatial multiplexing. In addition, which precoding the mobile station apparatus 1 performs is set by the base station apparatus 3, and the base station apparatus 3 includes information indicative of the precoding in the Uplink grant to transmit to the mobile station apparatus 1.

The uplink reference signal generation part 1079 generates a CAZA sequence that the base station apparatus 3 knows and that is obtained by a rule beforehand determined based on a cell identifier to identify the base station apparatus 3, the bandwidth of the PUSCH, etc. Further, the uplink reference signal generation part 1079 applies the cyclic shift and the orthogonal cover to the CAZAC sequence, according to the orthogonal resources of the DMRS identified by the number-of-spatial multiplexing sequence/orthogonal resource identification part 1013.

The multiplexing part 1075 rearranges the modulation symbols of the PUSCH to parallel, then performs Discrete Fourier Transform (DFT), and multiplexes the signal of the DFT-processed PUSCH, the signal of the PUCCH and the Uplink Reference Signal (DMRS and/or SRS). In addition, at this point, DMRSs of different orthogonal resources are time-multiplexed for each port of the PUSCH.

The radio transmission part 1077 performs Inverse Fast Fourier Transform on the multiplexed signal, performs modulation of the SC-FDMA scheme, adds a guard interval to the SC-FDMA-modulated SC-FDMA symbol, generates a baseband digital signal, converts the baseband digital signal into an analog signal, generates an in-phase component and quadrature component of the intermediate frequency from the analog signal, removes excessive frequency components with respect to the intermediate frequency band, converts (up-converts) the signal of the intermediate frequency into a signal of a high frequency, removes excessive frequency components, amplifies power, and outputs the signal to the transmission/reception antenna to transmit.

<In Regard to the Operation of the Wireless Communication System>

Figure 7:
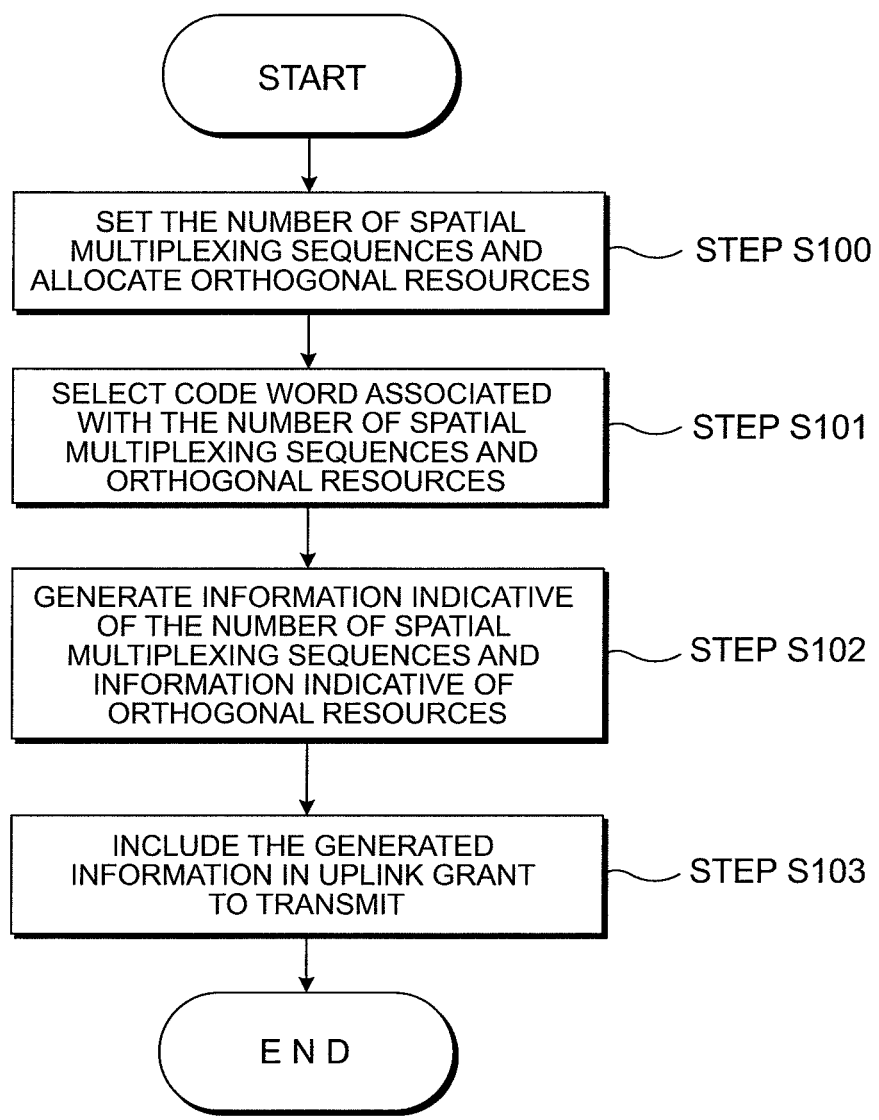
FIG. 7 is a flowchart showing an example of the operation of the base station apparatus 3 according to this Embodiment.

FIG. 7 is a flowchart showing an example of the operation of the base station apparatus 3 according to this Embodiment. The base station apparatus 3 estimates the channel state from the PUSCH, DMRS, and SRS received from the mobile station apparatus 1, sets the number of spatial multiplexing sequences that the mobile station apparatus 1 applies in transmitting the PUSCH, and allocates orthogonal resources of the DMRS which is time-multiplexed with the PUSCH and transmitted (step S100).

The base station apparatus 3 selects a code word to arrange in the information indicative of the orthogonal resources of the DMRS from the number of spatial multiplexing sequences and the orthogonal resources assigned in step S100 (step S101), and generates the information indicative of the orthogonal resources including the selected code word and information indicative of the number of spatial multiplexing sequences (step S102). The base station apparatus 3 includes the generated information indicative of the orthogonal resources and the generated information indicative of the number of spatial multiplexing sequences in an Uplink grant to transmit on the PDCCH (step S103).

Figure 8:
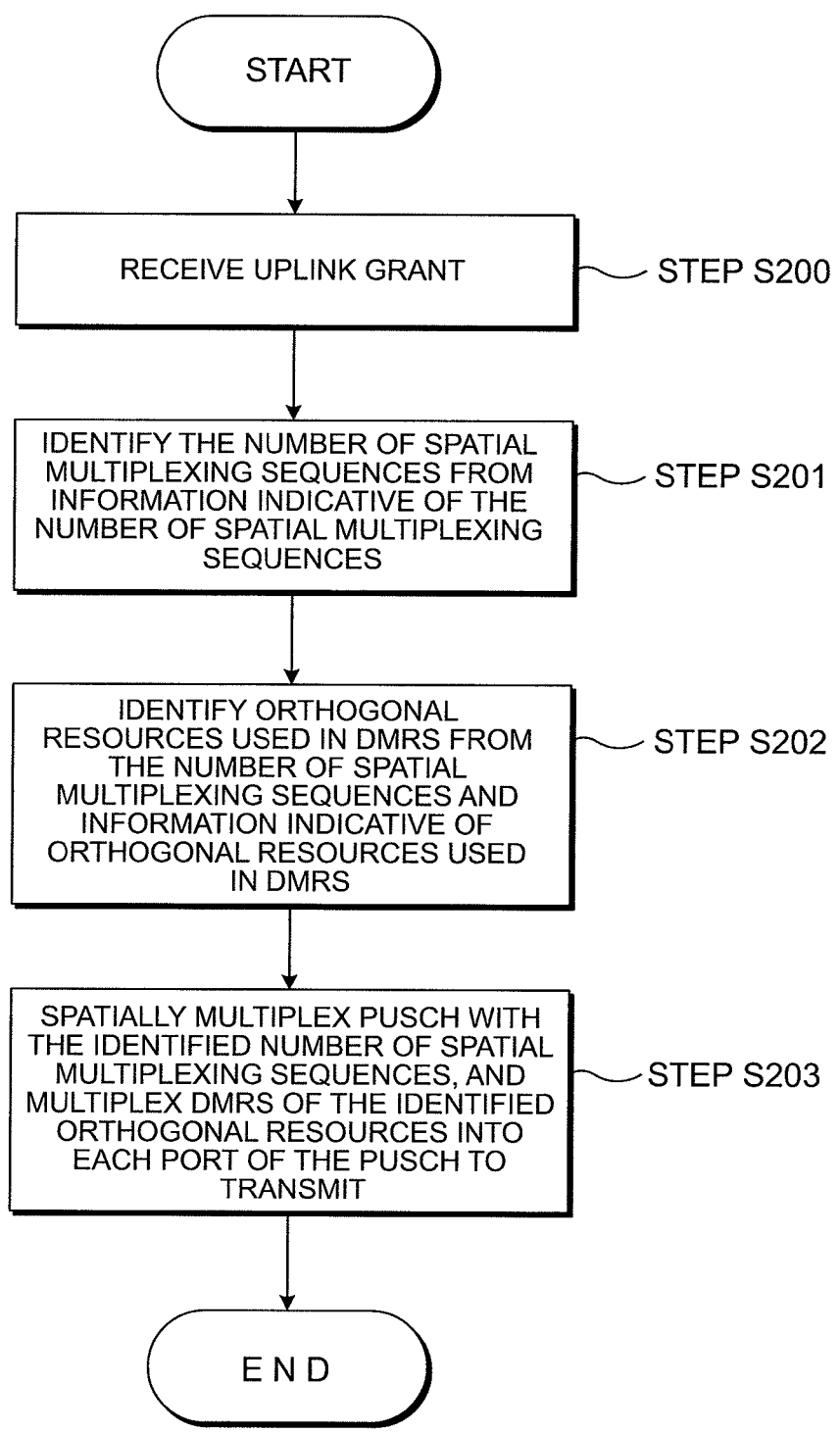
FIG. 8 is a flowchart showing an example of the operation of the mobile station apparatus 1 according to this Embodiment.

FIG. 8 is a flowchart showing an example of the operation of the mobile station apparatus 1 according to this Embodiment. The mobile station apparatus 1 receives the Uplink grant transmitted from the base station apparatus 3 (step S200), identifies the number of spatial multiplexing sequences used in transmission of the PUSCH from the information indicative of the number of spatial multiplexing sequences included in the Uplink grant (step S201), and identifies the orthogonal resources used in the DMRS from the identified number of spatial multiplexing sequences, and the information indicative of the orthogonal resources used in the DMRS included in the Uplink grant (step S202). The mobile station apparatus 1 spatially multiplexes the PUSCH with the number of spatial multiplexing sequences, and multiplexes the DMRS of the identified orthogonal resources into each port of the PUSCH to transmit to the base statin apparatus 3 (step S203).

Thus, according to this Embodiment, the base station apparatus 3 sets the number (rank) of spatial multiplexing sequences of data used by the mobile station apparatus 1 in transmitting a PUSCH, further sets orthogonal resources used by the mobile station apparatus 1 for the reference signal (DMRS) that is transmitted together with the PUSCH, selects a code point to arrange in information (first control information) indicative of the orthogonal resources based on the set orthogonal resources and the set number of spatial multiplexing sequences, and transmits downlink control information (Uplink grant) including at least the information indicative of the orthogonal resources and information (second control information) indicative of the number of spatial multiplexing sequences to the mobile station apparatus 1.

Meanwhile, the mobile station apparatus 1 receives the Downlink Control Information (Uplink grant) transmitted from the base station apparatus 3, selects orthogonal resources used in the reference signal (DMRS) set by the base station apparatus 3 from the information indicative of the orthogonal resources and the information indicative of the number of spatial multiplexing sequences included in the Uplink grant, applies the selected orthogonal resources to generate the reference signal (DMRS), and transmits the reference signal to the base station apparatus 3 together with the PUSCH. By this means, it is possible to notify of orthogonal resources of the DMRS that the base station apparatus 3 assigns to the mobile station apparatus 1 flexibly with the same overhead of the PDCCH as conventional overhead kept.

(A) To attain the object as described above, the invention took measures as described below. In other words, a wireless communication system of the invention is a wireless communication system in which a base station apparatus and at least one mobile station apparatus communicate with each other, and is characterized in that the base station apparatus sets the number (rank) of spatial multiplexing sequences of data used by the mobile station apparatus in transmitting a PUSCH, further sets orthogonal resources used by the mobile station apparatus for a reference signal that is transmitted together with the PUSCH, selects a code point to arrange in first control information indicative of orthogonal resources based on the set orthogonal resources and the set number of spatial multiplexing sequences, and transmits downlink control information including at least the first control information and second control information indicative of the set number of spatial multiplexing sequences to the mobile station apparatus, and that the mobile station apparatus receives the downlink control information, selects orthogonal resources to apply to the reference signal set by the base station apparatus from the first control information and the second control information included in the downlink control information, applies the selected orthogonal resources to generate the reference signal, and transmits the reference signal to the base station apparatus.

(B) Further, the orthogonal resources of the invention are characterized by being comprised of a combination of a length of the cyclic shift on the reference signal in the time domain, and an orthogonal code sequence (orthogonal cover) applied to the reference signal that is transmitted twice or more in a plurality of time symbols.

(C) Furthermore, a base station apparatus of the invention is abase station apparatus applied to a wireless communication system in which the base station apparatus and at least one mobile station apparatus communicate with each other, and is characterized by setting the number (rank) of spatial multiplexing sequences of data used by the mobile station apparatus in transmitting a PUSCH, further setting orthogonal resources used by the mobile station apparatus for a reference signal that is transmitted together with the PUSCH, selecting a code point to arrange in first control information indicative of orthogonal resources based on the set orthogonal resources and the set number of spatial multiplexing sequences, and transmitting downlink control information including at least the first control information and second control information indicative of the set number of spatial multiplexing sequences to the mobile station apparatus.

(D) Still furthermore, a mobile station apparatus of the invention is a mobile station apparatus applied to a wireless communication system in which a base station apparatus and at least one mobile station apparatus communicate with each other, and is characterized by receiving downlink control information including at least first control information for the base station apparatus to select a code point from combinations of the number of spatial multiplexing sequences (rank) of data, which is the number being used by the mobile station apparatus when the mobile station apparatus transmits a PUSCH, and orthogonal resources used in a reference signal that is transmitted together with the PUSCH, and second control information indicative of the number of spatial multiplexing sequences, selecting orthogonal resources to use in the reference signal set by the base station apparatus from the first control information and the second control information included in the downlink control information, applying the selected orthogonal resources to generate the reference signal, and transmitting the reference signal to the base station apparatus.

(E) Moreover, a wireless communication method of the invention is a wireless communication method applied to a wireless communication system in which a base station apparatus and at least one mobile station apparatus communicate with each other, and is characterized by having means for setting the number (rank) of spatial multiplexing sequences of data used by the mobile station apparatus in transmitting a PUSCH, means for setting orthogonal resources used by the mobile station apparatus for a reference signal that is transmitted together with the PUSCH, means for selecting a code point to arrange in first control information indicative of orthogonal resources based on the set orthogonal resources and the set number of spatial multiplexing sequences, and means for transmitting downlink control information including at least the first control information and second control information indicative of the set number of spatial multiplexing sequences to the mobile station apparatus.

(F) Further, a wireless communication method of the invention is a wireless communication method applied to a wireless communication system in which a base station apparatus and at least one mobile station apparatus communicate with each other, and is characterized in that the mobile station apparatus has means for receiving downlink control information including at least first control information for the base station apparatus to select a code point from combinations of the number of spatial multiplexing sequences (rank) of data, which is the number being used by the mobile station apparatus when the mobile station apparatus transmits a PUSCH, and orthogonal resources used in a reference signal that is transmitted together with the PUSCH, and second control information indicative of the number of spatial multiplexing sequences, means for selecting orthogonal resources to use in the reference signal set by the base station apparatus from the first control information and the second control information included in the downlink control information, and means for applying the selected orthogonal resources to generate the reference signal, and transmitting the reference signal to the base station apparatus.

Programs operating in the base station apparatus 3 and the mobile station apparatus 1 related to the invention may be programs (programs that cause the computer to function) which control the CPU (Central Processing Unit) and the like, to achieve the functions of the above-mentioned Embodiment related to the invention. Then, the information handled in the apparatuses is temporarily stored in RAM (Random Access Memory) at the time of the processing, subsequently stored in various kinds of ROM such as Flash ROM (Read Only Memory) and HDD (Hard Disk), and when necessary, read out by the CPU to be modified and written.

In addition, a part or the whole of the mobile station apparatus 1 and base station apparatus 3 in the above-mentioned Embodiment may be actualized by the computer. In this case, the program to actualize the control function may be stored in a computer readable storage medium, and the program stored in the storage medium may be read by a computer system and executed to actualize. In addition, the "computer system" described herein is the computer system incorporated into the mobile station apparatus 1 or the base station apparatus 3, and is assumed to include the OS and hardware of peripheral devices and the like.

Further, the "computer readable storage medium" means transportable media such as a flexible disk, magneto-optical disk, ROM, CD-ROM and the like, and storage devices such as a hard disk and the like incorporated into the computer system. Furthermore, the "computer readable storage medium" may include media that dynamically hold the program for a short time, such as communication lines in the case where the program is transmitted via communication channels of a network such as the Internet and telephone lines, and media that hold the program for a certain time, such as volatile memory inside the computer system that is the server or client in this case. Moreover, the above-mentioned programs may be to actualize a part of the functions as described previously, and further, may be to actualize the functions as described previously in combination of a program already stored in the computer system.

Furthermore, a part or the whole of the mobile station apparatus 1 and base station apparatus 3 in the above-mentioned Embodiment may be actualized as LSI that is typically an integrated circuit. Each function block of the mobile station apparatus 1 and base station apparatus 3 may be made in chip form separately, or a part or the whole of the blocks may be integrated and made in chip form. Still furthermore, the technique of integrated circuits is not limited to the LSI, and may be achieved by dedicate circuits or general-purpose processor. Moreover, when the technique of integrated circuits as a substitute for the LSI appears as semiconductor techniques progress, it is possible to use the integrated circuit by the technique.

As mentioned above, one Embodiment of the invention is specifically described with reference to the drawings, but specific configurations are not limited to the configurations as described above, and various changes in design and the like are capable of being made within the scope without departing from the subject matter of the invention.

Description of Symbols (1A, 1B, 1C) Mobile station apparatus
3 Base station apparatus
101 Higher layer processing part
103 Control part
105 Reception part
107 Transmission part
301 Higher layer processing part
303 Control part
305 Reception part
307 Transmission part
309 Channel measurement part
1011 Radio resource control part
1013 Number-of-spatial multiplexing sequence/orthogonal resource identification part
1015 Storage part
1051 Decoding part
1053 Demodulation part
1055 Demultiplexing part
1057 Radio reception part
1071 Coding part
1073 Modulation part
1075 Multiplexing part
1077 Radio transmission part
1079 Uplink reference signal generation part
3011 Radio resource control part
3013 Number-of-spatial multiplexing sequence/orthogonal resource setting part
3015 Storage part
3051 Decoding part
3053 Demodulation part
3055 Demultiplexing part
3057 Radio reception part
3071 Coding part
3073 Modulation part
3075 Multiplexing part
3077 Radio transmission part
3079 Downlink reference signal generation part

The invention claimed is:

1. A wireless communication system comprising:
a base station apparatus; and a mobile station apparatus, wherein
the base station apparatus and the mobile station apparatus are configured to or configured to and programmed to communicate with each other,
the base station apparatus configured to or configured to and programmed to transmit downlink control information to the mobile station apparatus, the downlink control information including at least first information indicating at least a number of layers which are used by the mobile station apparatus to transmit a PUSCH, and second information indicating a cyclic shift and an orthogonal code sequence for each of the layers,
the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layers,
the second information being a field of 3 bits in the downlink control information,
the mobile station apparatus configured to or configured to and programmed to receive the downlink control information,
to identify, based on at least the second information, the cyclic shift and the orthogonal code sequence for each of the layers,
to generate a demodulation reference signal for each of the layers based on the cyclic shift and the orthogonal code sequence, and
to transmit the generated demodulation reference signal for each of the layers to the base station apparatus.

2. A base station apparatus that is configured to or configured to and programmed to communicate with a mobile station apparatus, the base station apparatus comprising:
a processing circuit configured to or configured to and programmed to transmit downlink control information to the mobile station apparatus, the downlink control information including at least first information indicating at least a number of layers which are used by the mobile station apparatus to transmit a PUSCH, and second information indicating a cyclic shift and an orthogonal code sequence for each of the layers,
the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layers,
the second information being a field of 3 bits in the downlink control information.

3. The base station apparatus according to claim 2, wherein the number of layers indicated by the first information being used to identify the cyclic shift and the orthogonal code sequence for each of the layers.

4. A mobile station apparatus that is configured to or configured to and programmed to communicate with a base station apparatus, the mobile station apparatus comprising:
a reception circuit configured to or configured to and programmed to receive downlink control information transmitted from the base station apparatus, the downlink control information including at least first information indicating at least a number of layers which are used by the mobile station apparatus to transmit a PUSCH, and second information indicating a cyclic shift and an orthogonal code sequence for each of the layers,
the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layers,
the second information being a field of 3 bits in the downlink control information,
a processing circuit configured to or configured to and programmed to identify, based on at least the second information, the cyclic shift and the orthogonal code sequence for each of the layers, and to generate a demodulation reference signal for each of the layers based on the cyclic shift and the orthogonal code sequence, and
a transmission circuit configured to or configured to and programmed to transmit the generated demodulation reference signal for each of the layers to the base station apparatus.

5. The mobile station apparatus according to claim 4, wherein
the number of layers indicated by the first information being used to identify the cyclic shift and the orthogonal code sequence for each of the layers.

6. A communication method used in a base station apparatus that is configured to or configured to and programmed to communicate with a mobile station apparatus, the communication method comprising:
transmitting downlink control information to the mobile station apparatus, the downlink control information including at least first information indicating at least a number of layers which are used by the mobile station apparatus to transmit a PUSCH, and second information indicating a cyclic shift and an orthogonal code sequence for each of the layers, the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layers, the second information being a field of 3 bits in the downlink control information.

7. A communication method used in a mobile station apparatus that is configured to or configured to and programmed to communicate with a base station apparatus, the communication method comprising:

receiving downlink control information transmitted from the base station apparatus, the downlink control information including at least first information indicating at least a number of layers which are used by the mobile station apparatus to transmit a PUSCH, and second information indicating a cyclic shift and an orthogonal code sequence for each of the layers, the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layer, the second information being a field of 3 bits in the downlink control information, identifying, based on at least the second information, the cyclic shift and the orthogonal code sequence for each of the layers;

generating a demodulation reference signal for each of the layers based on the cyclic shift and the orthogonal code sequence; and transmitting the generated demodulation reference signal for each of the layers to the base station apparatus.

8. An integrated circuit used in a base station apparatus that is configured to or configured to and programmed to communicate with a mobile station apparatus, making a series of functions to be executable, the series of functions comprising:

transmitting downlink control information to the mobile station apparatus, the downlink control information including at least first information indicating at least a number of layers which are used by the mobile station apparatus to transmit a PUSCH, and second information indicating a cyclic shift and an orthogonal code sequence for each of the layers, the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layers, the second information being a field of 3 bits in the downlink control information.

9. An integrated circuit used in a mobile station apparatus that is configured to or configured to and programmed to communicate with a base station apparatus, making a series of functions to be executable, the series of functions comprising:

receiving downlink control information transmitted from the base station apparatus, the downlink control information including at least first information indicating at least a number of layers which are used by the mobile station apparatus to transmit a PUSCH, and second information indicating a cyclic shift and an orthogonal code sequence for each of the layers;

the second information being determined from a plurality of predetermined information which comprise:
(i) information indicating a first orthogonal code sequence being applied to all of demodulation reference signals for the layers,
(ii) information indicating a second orthogonal code sequence being applied to all of demodulation reference signals for the layers, the second orthogonal code sequence being different from the first orthogonal code sequence, and
(iii) information indicating the first orthogonal code sequence being applied to demodulation reference signals for one or some of the layers and indicating the second orthogonal code sequence being applied to demodulation reference signals for the other of the layers, the second information being a field of 3 bits in the downlink control information, identifying, based on at least the second information, the cyclic shift and the orthogonal code sequence for each of the layers;

generating a demodulation reference signal for each of the layers based on the cyclic shift and the orthogonal code sequence; and transmitting the generated demodulation reference signal for each of the layers to the base station apparatus.

\* \* \* \* \*